US011214942B2

(12) United States Patent
Kondo et al.

(10) Patent No.: US 11,214,942 B2
(45) Date of Patent: Jan. 4, 2022

(54) HYDRAULIC SYSTEM OF CONSTRUCTION MACHINE

(71) Applicant: KAWASAKI JUKOGYO KABUSHIKI KAISHA, Kobe (JP)

(72) Inventors: Akihiro Kondo, Kobe (JP); Ryosuke Kusumoto, Kobe (JP); Yuki Nakayama, Amagasaki (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/975,785

(22) PCT Filed: Feb. 25, 2019

(86) PCT No.: PCT/JP2019/007091
§ 371 (c)(1),
(2) Date: Aug. 26, 2020

(87) PCT Pub. No.: WO2019/163990
PCT Pub. Date: Aug. 29, 2019

(65) Prior Publication Data
US 2020/0407946 A1 Dec. 31, 2020

(30) Foreign Application Priority Data
Feb. 26, 2018 (JP) .............................. JP2018-032073

(51) Int. Cl.
E02F 9/22 (2006.01)
F15B 21/14 (2006.01)
(Continued)

(52) U.S. Cl.
CPC .......... *E02F 9/2296* (2013.01); *E02F 9/2217* (2013.01); *E02F 9/2285* (2013.01);
(Continued)

(58) Field of Classification Search
None
See application file for complete search history.

(56) References Cited

U.S. PATENT DOCUMENTS 10,215,199 B2 * 2/2019 Cosoli ..................... F15B 21/14
10,233,949 B2 * 3/2019 Versteyhe ............... F15B 1/033
(Continued)

FOREIGN PATENT DOCUMENTS

CN 111094664 A 5/2020
DE 102016224401 A1 * 6/2018 .............. F15B 1/024
JP 2014-109329 A 6/2014

*Primary Examiner* — Michael Leslie
(74) *Attorney, Agent, or Firm* — Oliff PLC

(57) ABSTRACT

A hydraulic system includes: a travel motor; travel pump connected to the travel motor, the travel pump driven by an engine; a work pump that sucks hydraulic oil from a tank through a suction line, and supplies the oil to a work hydraulic actuator through a delivery line, the work pump driven by the engine; a switching valve connected to the delivery line, and connected to a part of the suction line downstream of the check valve; and an accumulator connected to the switching valve. The switching valve switches between a neutral position in which the switching valve blocks a pressure accumulation line, a pressure release line, and the relay line, the pressure accumulation position in which the switching valve wherein the pressure accumulation line communicates with the relay line, a pressure release position in which the switching valve brings the relay line into communication with the pressure release line.

9 Claims, 6 Drawing Sheets

(51) Int. Cl.
*F15B 1/02* (2006.01)
*F15B 1/033* (2006.01)
*F16H 61/40* (2010.01)
F16H 61/4096 (2010.01)
F16H 61/4157 (2010.01)
F16H 61/431 (2010.01)

(52) U.S. Cl.
CPC .............. *F15B 1/024* (2013.01); *F15B 1/033* (2013.01); *F15B 21/14* (2013.01); *F16H 61/40* (2013.01); *E02F 9/2235* (2013.01); *E02F 9/2267* (2013.01); *E02F 9/2292* (2013.01); *F15B 2211/20576* (2013.01); *F16H 61/4096* (2013.01); *F16H 61/4157* (2013.01); *F16H 61/431* (2013.01)

(56) References Cited

U.S. PATENT DOCUMENTS

| | | | |
|---|---|---|---|
| 10,294,633 B2 * | 5/2019 | Kondo | F15B 11/08 |
| 10,400,802 B2 * | 9/2019 | Sugano | E02F 9/2217 |
| 11,035,100 B2 * | 6/2021 | Kondo | F15B 21/14 |
| 2016/0245311 A1 * | 8/2016 | Kajita | E02F 9/2292 |
| 2020/0217046 A1 | 7/2020 | Kondo et al. | |
| 2020/0277755 A1 * | 9/2020 | Kondo | F15B 1/024 |

* cited by examiner

HYDRAULIC SYSTEM OF CONSTRUCTION MACHINE

TECHNICAL FIELD

The present invention relates to a hydraulic system of a construction machine.

BACKGROUND ART

Among construction machines, such as wheel loaders and forklifts, there are those mounted with a hydraulic system that includes: a travel circuit that forms a hydraulic static transmission (HST) between an engine and traveling means, such as wheels or crawlers; and a work circuit for performing work, such as scooping work or lifting work.

For example, Patent Literature 1 discloses a hydraulic system 100 of a construction machine, which includes a travel circuit 110 as shown in FIG. 6. The travel circuit 110 includes: a travel pump 120, which is driven by an engine 101; and a travel motor 130, which rotates a travel drive shaft 102. The travel pump 120 is connected to the travel motor 130 by a pair of supply/discharge lines 141 and 142, such that a closed loop is formed. The supply/discharge lines 141 and 142 are connected to a charge pump 150.

The travel pump 120 is an over-center pump. When the construction machine travels forward, hydraulic oil is supplied to the travel motor 130 through one of the supply/discharge lines 141 and 142, and when the construction machine travels backward, the hydraulic oil is supplied to the travel motor 130 through the other one of the supply/discharge lines 141 and 142. The travel drive shaft 102 transmits torque from the travel motor 130 to a wheel 104. The travel drive shaft 102 is provided with a mechanical brake 103.

In addition, the hydraulic system 100 is configured to be able to regenerate kinetic energy during decelerating travel. Specifically, accumulators 170 are connected to the pair of supply/discharge lines 141 and 142, respectively, via switching valves 160. Pressurized oil discharged from the travel motor 130 during decelerating forward travel, and pressurized oil discharged from the travel motor 130 during decelerating backward travel, are separately accumulated in these accumulators 170, respectively. The pressurized oil accumulated in the accumulator 170 during decelerating forward travel is utilized when the construction machine travels backward next time, and the pressurized oil accumulated in the accumulator 170 during decelerating backward travel is utilized when the construction machine travels forward next time.

CITATION LIST

Patent Literature

PTL 1: Japanese Laid-Open Patent Application Publication No. 2014-109329

SUMMARY OF INVENTION

Technical Problem

However, the hydraulic system 100 shown in FIG. 6 requires two accumulators 170 for regenerating kinetic energy during decelerating travel. This causes high cost. Moreover, when accumulating the pressurized oil from one of the supply/discharge lines 141 and 142 into the accumulator 170, the hydraulic oil in a corresponding amount needs to be charged from the charge pump 150 to the other one of the supply/discharge lines 141 and 142.

Furthermore, in the hydraulic system 100 shown in FIG. 6, since the accumulator 170 is connected to each of the supply/discharge lines 141 and 142, braking force is limited by the setting pressure of the accumulator 170, and there is a case where only by the accumulation of the pressurized oil in the accumulator 170, sufficient braking force cannot be obtained. Also, the pressurized oil accumulated in the accumulator 170 cannot be utilized in a situation where the delivery pressure of the travel pump 120 becomes higher than the setting pressure of the accumulator 170 (e.g., during rapid acceleration).

In view of the above, an object of the present invention is to provide a hydraulic system of a construction machine, the hydraulic system being capable of regenerating kinetic energy during decelerating travel without using an accumulator in a travel circuit.

Solution to Problem

In order to solve the above-described problems, a hydraulic system of a construction machine according to the present invention includes: a travel motor that rotates a travel drive shaft; a travel pump that is connected to the travel motor such that a closed loop is formed, the travel pump being driven by an engine; a work pump that sucks hydraulic oil from a tank through a suction line provided with a check valve, and supplies the hydraulic oil to a work hydraulic actuator through a delivery line, the work pump being driven by the engine; a switching valve that is connected to the delivery line by a pressure accumulation line, and connected to a part of the suction line downstream of the check valve by a pressure release line; and an accumulator that is connected to the switching valve by a relay line. The switching valve is switched between a neutral position, a pressure accumulation position, and a pressure release position, the neutral position being a position in which the switching valve blocks the pressure accumulation line, the pressure release line, and the relay line, the pressure accumulation position being a position in which the switching valve brings the pressure accumulation line into communication with the relay line, the pressure release position being a position in which the switching valve brings the relay line into communication with the pressure release line.

According to the above configuration, during decelerating travel, since the travel pump functions as a motor, the driving of the work pump is assisted thereby. Accordingly, when the switching valve is switched to the pressure accumulation position, kinetic energy during decelerating travel can be converted into pressurized oil delivered from the work pump, and the pressurized oil can be accumulated in the accumulator. On the other hand, when the switching valve is switched to the pressure release position, the pressure at the suction side of the work pump increases. As a result, motive power required for driving the work pump decreases, and thereby energy consumption is reduced. Through such a cycle, kinetic energy during decelerating travel is regenerated. Since the accumulator is provided in a work circuit including the work pump, kinetic energy during decelerating travel can be regenerated without using an accumulator in a travel circuit.

The construction machine may be a wheel loader. The above hydraulic system may further include: a controller that controls the switching valve; an accelerator pedal that receives an acceleration command; a mechanical brake provided on the travel drive shaft; a brake pedal that receives a brake operation for the mechanical brake; a vehicle speed detector that detects a vehicle speed; and a delivery pressure detector that detects a delivery pressure of the work pump. The controller may: when a pressure accumulation condition is satisfied, switch the switching valve to the pressure accumulation position, the pressure accumulation condition being a condition that the accelerator pedal and the brake pedal are depressed concurrently and the vehicle speed detected by the vehicle speed detector is higher than a first threshold; and when the pressure accumulation condition is not satisfied, if the delivery pressure of the work pump, which is detected by the delivery pressure detector, is higher than a second threshold, switch the switching valve to the pressure release position, whereas if the delivery pressure of the work pump is lower than the second threshold, switch the switching valve to the neutral position. When the wheel loader performs the work of scooping a material to be carried, the wheel loader first travels to the vicinity of the material to be carried, and stops. Then, the wheel loader performs the scooping work with a bucket and a boom. When the wheel loader stops traveling, the brake pedal is depressed with the accelerator pedal kept depressed in order not to decrease the engine rotation speed in preparation for the scooping work performed thereafter. In light of this, if the pressure accumulation condition is defined as a condition that the accelerator pedal and the brake pedal are depressed concurrently and the vehicle speed is higher than the first threshold, it becomes possible to accumulate pressurized oil in the accumulator by efficiently utilizing a situation where the work pump is driven at a high engine rotation speed.

The above hydraulic system may further include a boom operation device and a bucket operation device, each of which includes an operating lever. The second threshold may be a value that is higher than the delivery pressure of the work pump when the operating lever of the boom operation device and the operating lever of the bucket operation device are in a neutral state. According to this configuration, when the work pump is in a standby state, the accumulator is in a pressure-releasing state. This consequently makes it possible to prevent the engine rotation speed from becoming excessively high.

The work pump may be a variable displacement pump. The above hydraulic system may further include a regulator that adjusts a tilting angle of the work pump. When the pressure accumulation condition is satisfied, the controller may switch the switching valve to the pressure accumulation position, and control the regulator such that the tilting angle of the work pump increases. According to this configuration, the braking force when the pressure accumulation condition is satisfied can be increased.

The above hydraulic system may further include a solenoid proportional valve provided on a signal pressure line that leads a signal pressure corresponding to a depression amount of the brake pedal to the mechanical brake from a brake operation device including the brake pedal, the solenoid proportional valve being capable of decreasing the signal pressure. The controller may control the solenoid proportional valve such that a braking force of the mechanical brake when the pressure accumulation condition is satisfied is less than the braking force of the mechanical brake when the pressure accumulation condition is not satisfied. This configuration makes it possible to suppress the overall braking force from becoming excessively high due to the pressurized oil being accumulated in the accumulator.

Advantageous Effects of Invention

The present invention makes it possible to regenerate kinetic energy during decelerating travel without using an accumulator in a travel circuit.

DESCRIPTION OF EMBODIMENTS

Figure 1:
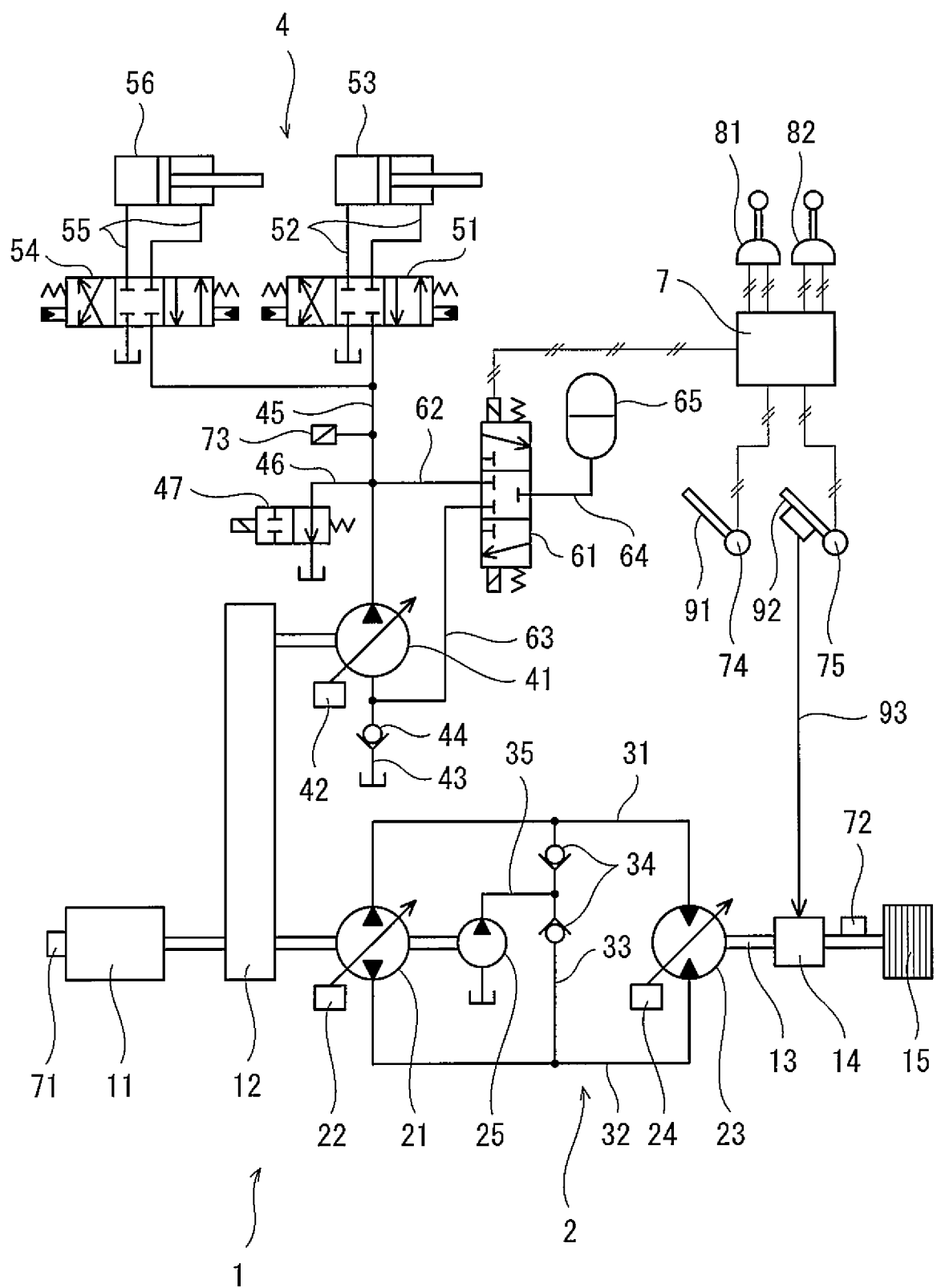
FIG. 1 shows a schematic configuration of a hydraulic system of a construction machine according to one embodiment of the present invention.

FIG. 1 shows a hydraulic system 1 of a construction machine according to one embodiment of the present invention. In the present embodiment, the construction machine is a wheel loader including a wheel 15 as traveling means. Alternatively, the construction machine may be, for example, a forklift, a compact truck loader, or a crawler carrier. In a case where the construction machine is a compact truck loader or a crawler carrier, the traveling means is a crawler.

The hydraulic system 1 installed in the construction machine includes: an engine 11; a travel circuit 2, which forms a hydraulic static transmission (HST) between the engine 11 and the wheel 15; and a work circuit 4 for performing, for example, scooping work.

The travel circuit 2 includes: a travel pump 21, which is driven by the engine 11; and a travel motor 23, which rotates a travel drive shaft 13. The travel pump 21 is connected to the travel motor 23 by a pair of supply/discharge lines 31 and 32, such that a closed loop is formed.

In the present embodiment, the output shaft of the engine 11 is coupled to the rotating shaft of the travel pump 21 via a gearbox 12. The output shaft of the engine 11 is also coupled to the rotating shaft of a work pump 41 via the gearbox 12. The work pump 41 will be described below.

The travel pump 21 is an over-center pump. When the construction machine travels forward, hydraulic oil is supplied to the travel motor 23 through one of the supply/discharge lines 31 and 32, and when the construction machine travels backward, the hydraulic oil is supplied to the travel motor 23 through the other one of the supply/discharge lines 31 and 32. The travel drive shaft 13 transmits torque from the travel motor 23 to the wheel 15. The travel drive shaft 13 is provided with a mechanical brake 14.

The mechanical brake 14 is configured to press a wear component, such as a pad or lining, against a disc or drum that rotates together with the travel drive shaft 13, thereby applying braking force to the travel drive shaft 13. To be more specific, the mechanical brake 14 includes brake cylinders provided for respective wheels. When a brake pedal 92, which will be described below, is depressed, pressurized oil is generated in a master cylinder. The generated pressurized oil is led to each brake cylinder, and consequently, the wear component is pressed against the disc or drum.

The supply/discharge lines 31 and 32 are connected to each other by a bridging passage 33. The bridging passage 33 is provided with a pair of check valves 34, which are directed opposite to each other. A part of the bridging passage 33 between the check valves 34 is connected to a charge pump 25 by a charge line 35. Although not illustrated, a relief line is branched off from the charge line 35, and the relief line is provided with a relief valve.

The rotating shaft of the charge pump 25 is coupled to the output shaft of the engine 11 via the rotating shaft of the travel pump 21 and the gearbox 12. The charge pump 25 is driven by the engine 11.

The travel pump 21 is a variable displacement pump whose tilting angle is changeable. In the present embodiment, the travel pump 21 is a swash plate pump whose tilting angle is defined by the angle of its swash plate. Alternatively, the travel pump 21 may be a bent axis pump whose tilting angle is defined by the angle of its tilted axis. The tilting angle of the travel pump 21 is adjusted by a regulator 22.

In the present embodiment, the regulator 22 moves in accordance with an electrical signal. Alternatively, the regulator 22 may move in accordance with a hydraulic pilot pressure or a manual lever. For example, the regulator 22 may electrically change the hydraulic pressure applied to a servo piston coupled to the swash plate of the travel pump 21, or may be an electric actuator coupled to the swash plate of the travel pump 21.

The travel motor 23 is a variable displacement motor whose tilting angle is changeable. In the present embodiment, the travel motor 23 is a swash plate motor whose tilting angle is defined by the angle of its swash plate. Alternatively, the travel motor 23 may be a bent axis motor whose tilting angle is defined by the angle of its tilted axis. The tilting angle of the travel motor 23 is adjusted by a regulator 24.

In the present embodiment, the regulator 24 moves in accordance with an electrical signal. Alternatively, the regulator 24 may move in accordance with a hydraulic pilot pressure. For example, the regulator 24 may electrically change the hydraulic pressure applied to a servo piston coupled to the swash plate of the travel motor 23, or may be an electric actuator coupled to the swash plate of the travel motor 23.

The regulators 22 and 24 are controlled by a controller 7. It should be noted that FIG. 1 shows only part of signal lines for simplifying the drawing. For example, the controller 7 is a computer including a CPU and memories such as a ROM and RAM. The CPU executes a program stored in the ROM.

An accelerator pedal 91 and the brake pedal 92 are provided in an operator cab that is not shown. The accelerator pedal 91 receives an acceleration command regarding the engine rotation speed, and the brake pedal 92 receives a brake operation for the mechanical brake 14.

The mechanical brake 14 is connected, by a signal pressure line 93, to a brake operation device including the brake pedal 92. The brake operation device outputs a signal pressure corresponding to a depression amount of the brake pedal 92. That is, the signal pressure outputted from the brake operation device increases in accordance with increase in the depression amount of the brake pedal 92. The signal pressure outputted from the brake operation device is led to the mechanical brake 14 through the signal pressure line 93.

A depression amount $\theta A$ of the accelerator pedal 91 is detected by a first depression amount detector 74. A depression amount $\theta B$ of the brake pedal 92 is detected by a second depression amount detector 75. The first depression amount detector 74 and the second depression amount detector 75 are, for example, potentiometers.

The controller 7 is electrically connected to the first depression amount detector 74 and the second depression amount detector 75. The controller 7 is also electrically connected to a rotation speed detector 71, which detects the engine rotation speed. The controller 7 is further electrically connected to a vehicle speed detector 72, which detects a vehicle speed V. In the present embodiment, the vehicle speed detector 72 detects the rotation speed of the travel drive shaft 13 as the vehicle speed V.

The controller 7 controls the engine 11, such that the engine rotation speed detected by the rotation speed detector 71 changes in accordance with the depression amount $\theta A$ of the accelerator pedal 91, which is detected by the first depression amount detector 74, and the vehicle speed V, which is detected by the vehicle speed detector 72. For example, when the vehicle speed V is lower than a particular value, the engine rotation speed of the engine 11 is increased to a predetermined engine rotation speed in accordance with increase in the depression amount $\theta A$ of the accelerator pedal 91, and when the vehicle speed V is higher than or equal to the particular value, the engine rotation speed of the engine 11 is kept at a substantially constant rotation speed.

Further, in a case where only the accelerator pedal 91 is depressed, the controller 7 controls the regulator 22 for the travel pump 21 and the regulator 24 for the travel motor 23 based on the depression amount $\theta A$ of the accelerator pedal 91. For example, the controller 7 controls the regulator 22 for the travel pump 21, such that the tilting angle of the travel pump 21 increases in accordance with increase in the depression amount $\theta A$ of the accelerator pedal 91.

On the other hand, when the brake pedal 92 is depressed with the accelerator pedal 91 kept depressed, the controller 7 controls the regulator 22 for the travel pump 21 and the regulator 24 for the travel motor 23 based on the depression amount $\theta B$ of the brake pedal 92. For example, the controller 7 controls the regulator 22 for the travel pump 21, such that the tilting angle of the travel pump 21 decreases in accordance with increase in the depression amount $\theta B$ of the brake pedal 92.

The work circuit 4 includes: the work pump 41, which is driven by the engine 11; and a boom cylinder 53 and a bucket cylinder 56, which serve as work hydraulic actuators. The boom cylinder 53 swings an unshown boom, and the bucket cylinder 56 swings an unshown bucket.

The work pump 41 is connected to a tank by a suction line 43, and to a boom control valve 51 and a bucket control valve 54 by a delivery line 45. The boom control valve 51 is connected to the boom cylinder 53 by a pair of supply/discharge lines 52, and the bucket control valve 54 is connected to the bucket cylinder 56 by a pair of supply/discharge lines 55. That is, the work pump 41 sucks the hydraulic oil from the tank through the suction line 43, supplies the hydraulic oil to the boom cylinder 53 through the delivery line 45, the boom control valve 51, and one of the supply/discharge lines 52, and supplies the hydraulic oil to the bucket cylinder 56 through the delivery line 45, the bucket control valve 54, and one of the supply/discharge lines 55.

The work pump 41 is a variable displacement pump whose tilting angle is changeable. In the present embodiment, the work pump 41 is a swash plate pump. Alternatively, the work pump 41 may be a bent axis pump. The tilting angle of the work pump 41 is adjusted by a regulator 42. It should be noted that the minimum delivery flow rate of the work pump 41 is set to be greater than zero.

A delivery pressure Pw of the work pump 41 is kept to be lower than or equal to a relief pressure by an unshown relief valve. An unloading line 46 is branched off from the delivery line 45, and the unloading line 46 is provided with an unloading valve 47.

In the present embodiment, the regulator 42 moves in accordance with an electrical signal. Alternatively, the regulator 24 may move in accordance with a hydraulic pilot pressure. For example, the regulator 42 may electrically change the hydraulic pressure applied to a servo piston coupled to the swash plate of the work pump 41, or may be an electric actuator coupled to the swash plate of the work pump 41.

A boom operation device 81 and a bucket operation device 82 are provided in the operator cab, which is not shown. The boom operation device 81 includes an operating lever that receives a boom operation, and outputs a boom operation signal corresponding to an inclination angle of the operating lever. That is, the boom operation signal outputted from the boom operation device 81 increases in accordance with increase in the inclination angle (i.e., operating amount) of the operating lever. Similarly, the bucket operation device 82 includes an operating lever that receives a bucket operation, and outputs a bucket operation signal corresponding to an inclination angle of the operating lever.

In the present embodiment, each of the boom operation device 81 and the bucket operation device 82 is an electrical joystick that outputs an electrical signal as an operation signal. The boom operation signal outputted from the boom operation device 81, and the bucket operation signal outputted from the bucket operation device 82, are inputted to the controller 7. The controller 7 controls the boom control valve 51 via an unshown pair of solenoid proportional valves, such that the opening area of the boom control valve 51 is adjusted to an opening area corresponding to the boom operation signal. The controller 7 also controls the bucket control valve 54 via an unshown pair of solenoid proportional valves, such that the opening area of the bucket control valve 54 is adjusted to an opening area corresponding to the bucket operation signal.

The controller 7 further controls the regulator 42 and the unloading valve 47, such that the tilting angle of the work pump 41 increases, and the opening area of the unloading valve 47 decreases, in accordance with increase in the boom operation signal and/or the bucket operation signal.

It should be noted that each of the boom operation device 81 and the bucket operation device 82 may be a pilot operation valve that outputs a pilot pressure as an operation signal. In this case, pilot ports of the boom control valve 51 are connected by pilot lines to the boom operation device 81, which is a pilot operation valve, and pilot ports of the bucket control valve 54 are connected by pilot lines to the bucket operation device 82, which is a pilot operation valve. Further, in a case where the boom operation device 81 is a pilot operation valve, the pilot lines between the boom control valve 51 and the boom operation device 81 are each provided with a pressure detector, and a pilot pressure (a boom operation signal) detected by the pressure detector is inputted to the controller 7. The same is true in a case where the bucket operation device 82 is a pilot operation valve. Alternatively, the boom control valve 51 and the bucket control valve 54 may be solenoid pilot valves.

The present embodiment further adopts a configuration for regenerating kinetic energy during decelerating travel by utilizing the work pump 41.

Specifically, the suction line 43 of the work pump 41 is provided with a check valve 44. A part of the suction line 43 downstream of the check valve 44 is connected to a switching valve 61 by a pressure release line 63. Also, the switching valve 61 is connected to the delivery line 45 by a pressure accumulation line 62, and to an accumulator 65 by a relay line 64.

The switching valve 61 is switched between a neutral position, a pressure accumulation position (upper position in FIG. 1), and a pressure release position (lower position in FIG. 1). When the switching valve 61 is in the neutral position, the switching valve 61 blocks the pressure accumulation line 62, the pressure release line 63, and the relay line 64. When the switching valve 61 is in the pressure accumulation position, the switching valve 61 blocks the pressure release line 63, and brings the pressure accumulation line 62 into communication with the relay line 64. When the switching valve 61 is in the pressure release position, the switching valve 61 blocks the pressure accumulation line 62, and brings the relay line 64 into communication with the pressure release line 63.

Figure 2:
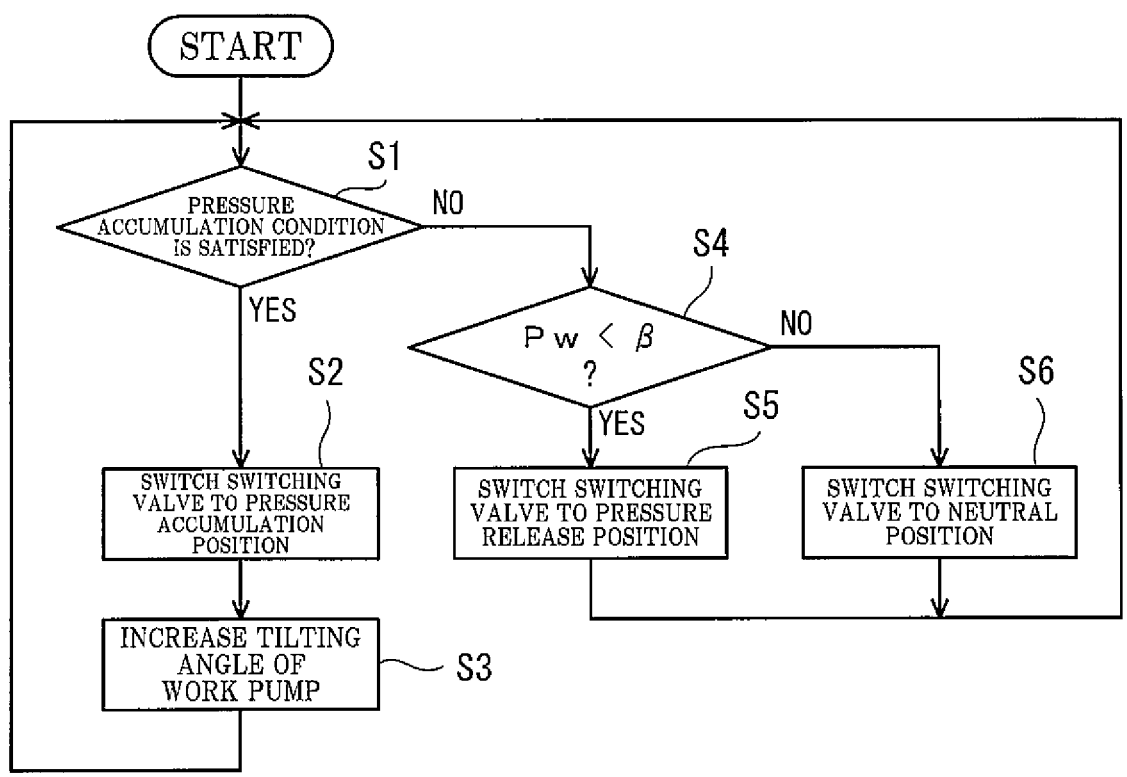
FIG. 2 is a flowchart of control performed by a controller.
Figure 3:
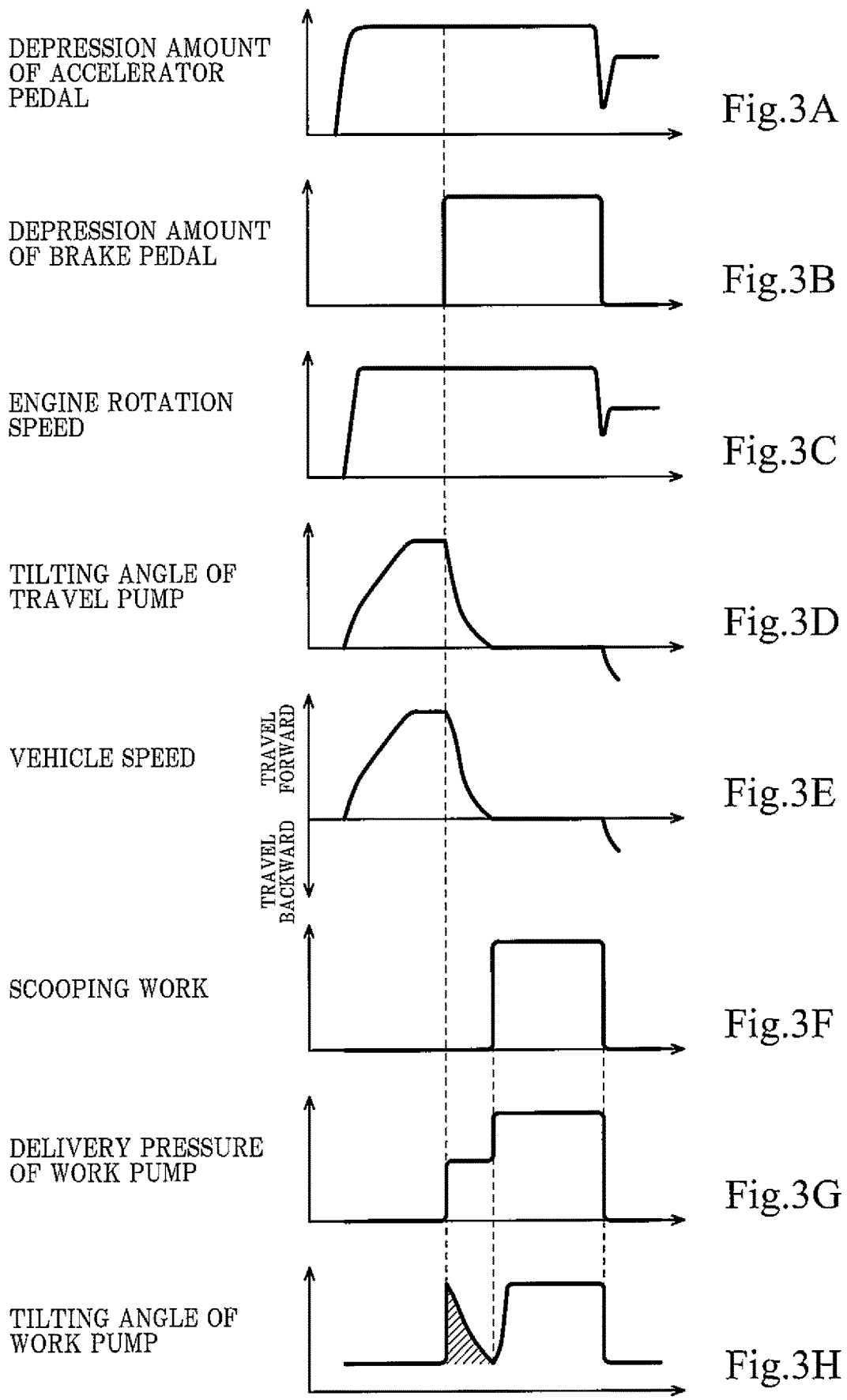
FIG. 3A to FIG. 3H are charts showing temporal changes in the depression amount of an accelerator pedal, the depression amount of a brake pedal, an engine rotation speed, the tilting angle of a travel pump, a vehicle speed, scooping work, the delivery pressure of a work pump, and the tilting angle of the work pump, respectively.

The switching valve 61 is controlled by the controller 7. The controller 7 is also electrically connected to a delivery pressure detector 73, which detects the delivery pressure Pw of the work pump 41. FIG. 2 is a flowchart of control of the switching valve 61, which is performed by the controller 7.

First, the controller 7 determines whether or not a pressure accumulation condition is satisfied (step S1). When the pressure accumulation condition is satisfied (YES in step S1), the controller 7 switches the switching valve 61 to the pressure accumulation position (step S2).

The pressure accumulation condition is a condition that the accelerator pedal 91 and the brake pedal 92 are depressed concurrently and the vehicle speed V detected by the vehicle speed detector 72 is higher than a first threshold α. The controller 7 determines whether or not the accelerator pedal 91 is depressed by comparing the depression amount θA of the accelerator pedal 91, which is detected by the first depression amount detector 74, with a first setting value θ1, and determines whether or not the brake pedal 92 is depressed by comparing the depression amount θB of the brake pedal 92, which is detected by the second depression amount detector 75, with a second setting value θ2. The first threshold α is an index for determining whether or not the wheel loader is traveling. The first threshold α is, for example, about 1 km/h.

When switching the switching valve 61 to the pressure accumulation position, the controller 7 controls the regulator 42 such that the tilting angle of the work pump 41 increases (step S3). It should be noted that step S3 may be eliminated. Also, when switching the switching valve 61 to the pressure accumulation position, the controller 7 may control the regulator 42 such that the amount of increase in the tilting angle of the work pump 41 decreases in accordance with decrease in the vehicle speed V.

On the other hand, when the pressure accumulation condition is not satisfied (NO in step S1), the controller 7 switches the switching valve 61 to the neutral position or the pressure release position based on the delivery pressure Pw of the work pump 41, which is detected by the delivery pressure detector 73. To be more specific, in a case where the delivery pressure Pw of the work pump 41 is higher than a second threshold β, the controller 7 switches the switching valve 61 to the pressure release position, whereas in a case where the delivery pressure Pw of the work pump 41 is lower than the second threshold β, the controller 7 switches the switching valve 61 to the neutral position.

The second threshold β is an index for determining whether or not the hydraulic oil is being supplied from the work pump 41 to a work hydraulic actuator (i.e., whether or not work by the work circuit 4 is being performed). For example, the second threshold β is 0.1 to 10 MPa. Desirably, the second threshold β is a value (e.g., 2 to 10 MPa) that is higher than the delivery pressure Pw of the work pump 41 when the operating lever of the boom operation device 81 and the operating lever of the bucket operation device 82 are in a neutral state. The reason for setting the second threshold β to such a value is that if the second threshold β is set to a relatively high value, the accumulator 65 will be in a pressure-releasing state when the work pump 41 is in a standby state. This consequently makes it possible to prevent the engine rotation speed from becoming excessively high.

For example, FIGS. 3A to 3H are timing charts for a period from before to after the start of scooping work. When the wheel loader travels to the vicinity of a material to be carried, only the accelerator pedal 91 is depressed. Normally, while the wheel loader is traveling, the boom operation device 81 and the bucket operation device 82 are not operated. Accordingly, the switching valve 61 is kept in the neutral position until the brake pedal 92 is depressed.

When the wheel loader stops after arriving at the vicinity of the material to be carried, the brake pedal 92 is depressed with the accelerator pedal 91 kept depressed. It should be noted that some operator may depress the brake pedal 92 while slightly returning the accelerator pedal 91. As a result, the tilting angle of the travel pump 21 decreases, and the mechanical brake 14 applies. Consequently, the vehicle speed V decreases. During decelerating travel, since the travel pump 21 functions as a motor, the driving of the work pump 41 is assisted thereby.

Since the brake pedal 92 is depressed with the accelerator pedal 91 kept depressed, the switching valve 61 is switched to the pressure accumulation position, and also, the tilting angle of the work pump 41 increases, causing increase in the delivery flow rate of the work pump 41. Accordingly, the delivery pressure of the work pump 41 increases to the setting pressure of the accumulator 65, and the oil delivered from the work pump 41 is accumulated in the accumulator 65. That is, when the switching valve 61 is switched to the pressure accumulation position, kinetic energy during decelerating travel can be converted into pressurized oil delivered from the work pump 41, and the pressurized oil can be accumulated in the accumulator 65.

Thereafter, the scooping work is started, and when the delivery pressure Pw of the work pump 41 has become higher than the second threshold β, the switching valve 61 is switched to the pressure release position, and the pressure at the suction side of the work pump 41 increases. As a result, motive power required for driving the work pump 41 decreases, and thereby energy consumption is reduced.

As described above, in the hydraulic system 1 according to the present embodiment, kinetic energy during decelerating travel is regenerated through a cycle in which pressurized oil is accumulated in the accumulator 65 and then the accumulated pressurized oil is released from the accumulator 65. Since the accumulator 65 is provided in the work circuit 4, kinetic energy during decelerating travel can be regenerated without using an accumulator in the travel circuit 2.

Further, in the present embodiment, the pressure accumulation condition is defined as a condition that the accelerator pedal 91 and the brake pedal 92 are depressed concurrently and the vehicle speed V is higher than the first threshold α. This makes it possible to accumulate pressurized oil in the accumulator 65 by efficiently utilizing a situation where the work pump 41 is driven at a high engine rotation speed immediately before the start of the scooping work.

Moreover, in the present embodiment, when the pressure accumulation condition is satisfied, the tilting angle of the work pump 41 increases. Accordingly, the torque generated by the work pump 41 (which is proportional to the product of the delivery pressure and the delivery capacity of the work pump 41) increases, which makes it possible to increase the braking force.

Furthermore, in the present embodiment, when the switching valve 61 is switched to the pressure accumulation position, the amount of increase in the tilting angle of the work pump 41 (which is indicated by a hatched area in FIG. 3H) decreases in accordance with decrease in the vehicle speed V. Accordingly, the torque generated by the work pump 41 can be reduced in accordance with decrease in the vehicle speed V, i.e., in accordance with decrease in kinetic energy. This makes it possible to ease a sensation that the braking force is too strong in the latter half of the deceleration.

OTHER EMBODIMENTS

The present invention is not limited to the above-described embodiment. Various modifications can be made without departing from the scope of the present invention.

Figure 4:
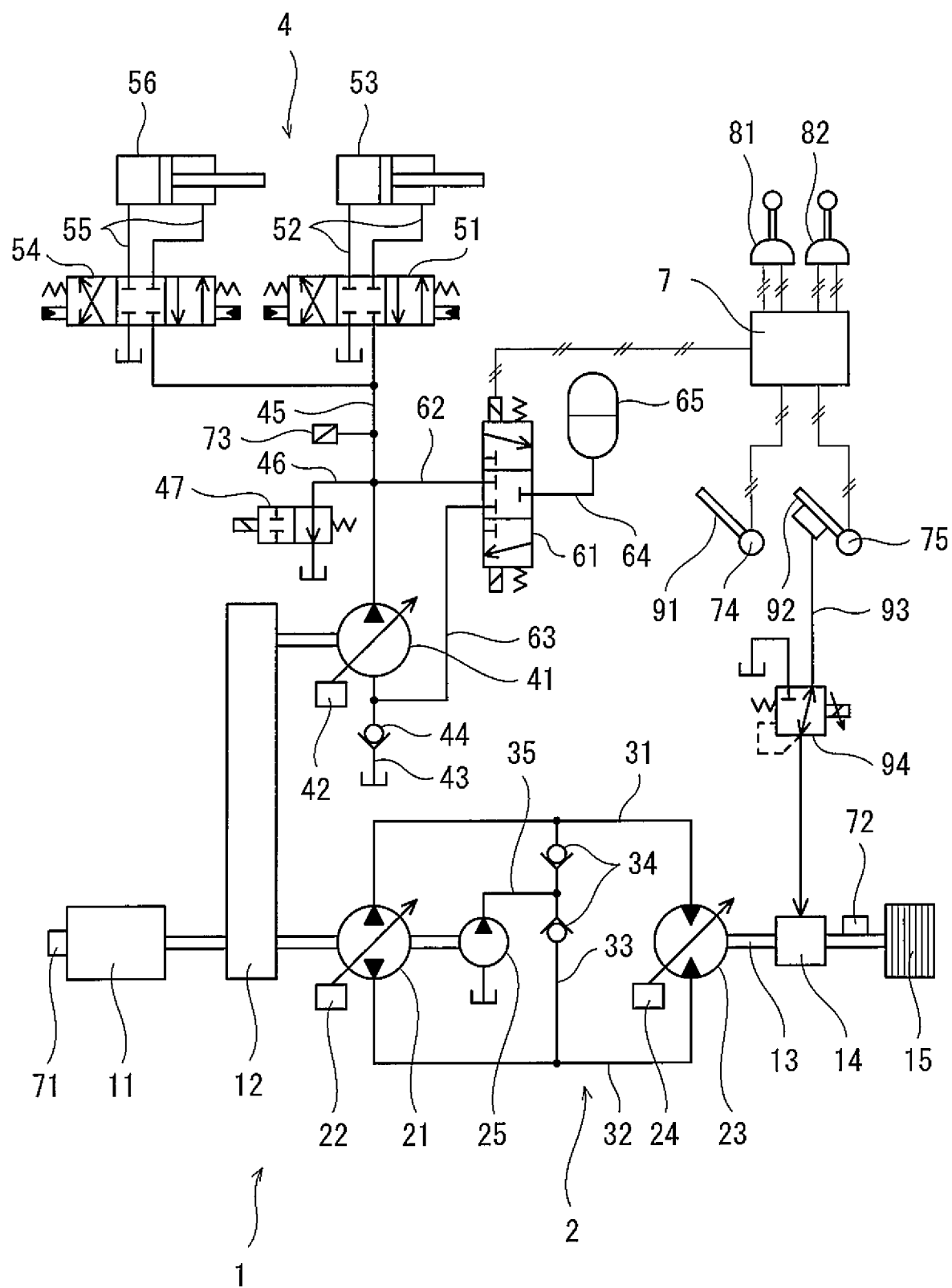
FIG. 4 shows a schematic configuration of the hydraulic system according to a variation.

For example, as shown in FIG. 4, the signal pressure line 93 between the mechanical brake 14 and the brake operation device including the brake pedal 92 may be provided with a solenoid proportional valve 94, which is capable of decreasing the signal pressure outputted from the brake operation device. In this case, the controller 7 controls the solenoid proportional valve 94, such that the braking force of the mechanical brake 14 when the pressure accumulation condition is satisfied is less than the braking force of the mechanical brake 14 when the pressure accumulation condition is not satisfied. According to this configuration, when the load on the work pump 41 increases, braking force is applied to the travel drive shaft 13 via the travel pump 21 and the travel motor 23. Accordingly, the amount of wear of the wear components, such as the pads or linings, of the mechanical brake 14 is reduced. Moreover, this configuration makes it possible to suppress the overall braking force from becoming excessively high due to the pressurized oil being accumulated in the accumulator 65.

Figure 5:
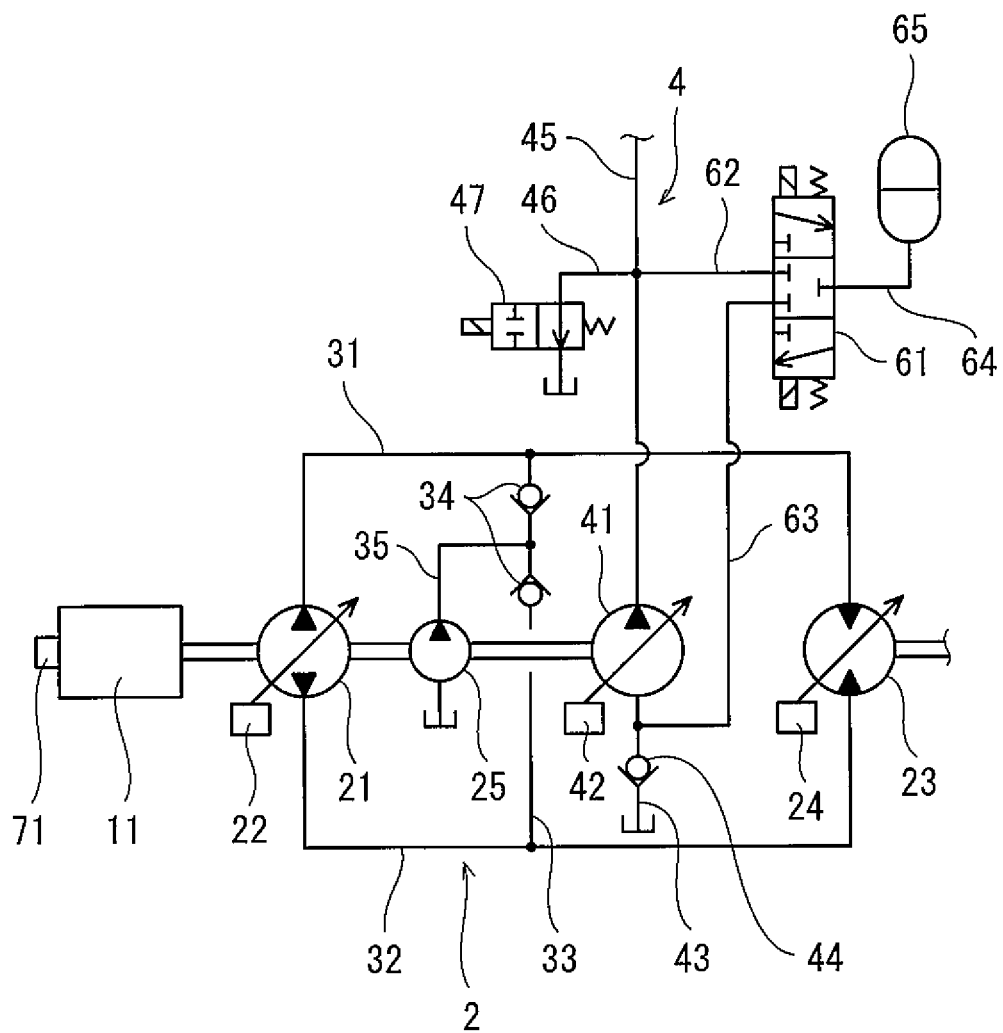
FIG. 5 shows a schematic configuration of a part of the hydraulic system according to another variation.
Figure 6:
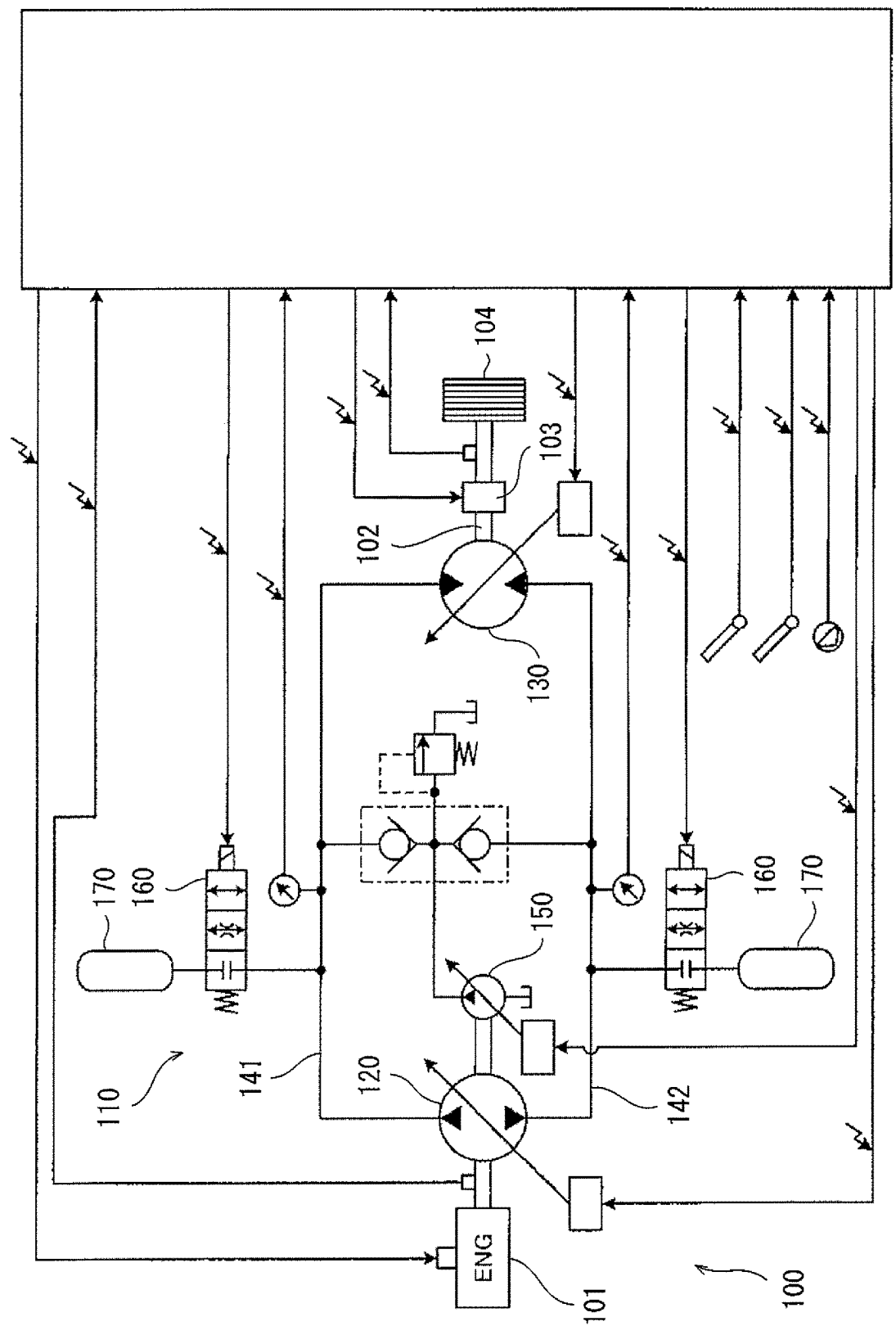
FIG. 6 shows a schematic configuration of a conventional hydraulic system of a construction machine.

As shown in FIG. 5, the output shaft of the engine 11 may be directly coupled to the rotating shaft of the travel pump 21. In this case, the rotating shaft of the work pump 41 may be directly coupled to the rotating shaft of the charge pump 25.

REFERENCE SIGNS LIST 1 hydraulic system
11 engine
13 travel drive shaft
14 mechanical brake
21 travel pump
23 travel motor
41 work pump
42 regulator
43 suction line
44 check valve 45 delivery line
53 boom cylinder (work hydraulic actuator)
56 bucket cylinder (work hydraulic actuator)
61 switching valve
62 pressure accumulation line
63 pressure release line
64 relay line
65 accumulator
7 controller
72 vehicle speed detector
73 delivery pressure detector
81 boom operation device
82 bucket operation device
91 accelerator pedal
92 brake pedal
93 signal pressure line
94 solenoid proportional valve

The invention claimed is:

1. A hydraulic system of a construction machine, comprising:
   a travel motor that rotates a travel drive shaft;
   a travel pump that is connected to the travel motor such that a closed loop is formed, the travel pump being driven by an engine;
   a work pump that sucks hydraulic oil from a tank through a suction line provided with a check valve, and supplies the hydraulic oil to a work hydraulic actuator through a delivery line, the work pump being driven by the engine;
   a switching valve that is connected to the delivery line by a pressure accumulation line, and connected to a part of the suction line downstream of the check valve by a pressure release line; and
   an accumulator that is connected to the switching valve by a relay line, wherein
   the switching valve is switched between a neutral position, a pressure accumulation position, and a pressure release position, the neutral position being a position in which the switching valve blocks the pressure accumulation line, the pressure release line, and the relay line, the pressure accumulation position being a position in which the switching valve brings the pressure accumulation line into communication with the relay line, the pressure release position being a position in which the switching valve brings the relay line into communication with the pressure release line.

2. The hydraulic system of a construction machine according to claim 1, wherein
   the construction machine is a wheel loader,
   the hydraulic system further comprises:
   a controller that controls the switching valve;
   an accelerator pedal that receives an acceleration command;
   a mechanical brake provided on the travel drive shaft;
   a brake pedal that receives a brake operation for the mechanical brake;
   a vehicle speed detector that detects a vehicle speed; and
   a delivery pressure detector that detects a delivery pressure of the work pump, and
   the controller:
   when a pressure accumulation condition is satisfied, switches the switching valve to the pressure accumulation position, the pressure accumulation condition being a condition that the accelerator pedal and the brake pedal are depressed concurrently and the vehicle speed detected by the vehicle speed detector is higher than a first threshold; and
   when the pressure accumulation condition is not satisfied, if the delivery pressure of the work pump, which is detected by the delivery pressure detector, is higher than a second threshold, switches the switching valve to the pressure release position, whereas if the delivery pressure of the work pump is lower than the second threshold, switches the switching valve to the neutral position.

3. The hydraulic system of a construction machine according to claim 2, further comprising a boom operation device and a bucket operation device, each of which includes an operating lever, wherein
   the second threshold is a value that is higher than the delivery pressure of the work pump when the operating lever of the boom operation device and the operating lever of the bucket operation device are in a neutral state.

4. The hydraulic system of a construction machine according to claim 2, wherein
   the work pump is a variable displacement pump,
   the hydraulic system further comprises a regulator that adjusts a tilting angle of the work pump, and
   when the pressure accumulation condition is satisfied, the controller switches the switching valve to the pressure accumulation position, and controls the regulator such that the tilting angle of the work pump increases.

5. The hydraulic system of a construction machine according to claim 2, further comprising a solenoid proportional valve provided on a signal pressure line that leads a signal pressure corresponding to a depression amount of the brake pedal to the mechanical brake from a brake operation device including the brake pedal, the solenoid proportional valve being capable of decreasing the signal pressure, wherein
   the controller controls the solenoid proportional valve such that a braking force of the mechanical brake when the pressure accumulation condition is satisfied is less than the braking force of the mechanical brake when the pressure accumulation condition is not satisfied.

6. The hydraulic system of a construction machine according to claim 3, wherein
   the work pump is a variable displacement pump,
   the hydraulic system further comprises a regulator that adjusts a tilting angle of the work pump, and
   when the pressure accumulation condition is satisfied, the controller switches the switching valve to the pressure accumulation position, and controls the regulator such that the tilting angle of the work pump increases.

7. The hydraulic system of a construction machine according to claim 3, further comprising a solenoid proportional valve provided on a signal pressure line that leads a signal pressure corresponding to a depression amount of the brake pedal to the mechanical brake from a brake operation device including the brake pedal, the solenoid proportional valve being capable of decreasing the signal pressure, wherein
   the controller controls the solenoid proportional valve such that a braking force of the mechanical brake when the pressure accumulation condition is satisfied is less than the braking force of the mechanical brake when the pressure accumulation condition is not satisfied.

8. The hydraulic system of a construction machine according to claim 4, further comprising a solenoid proportional valve provided on a signal pressure line that leads a signal pressure corresponding to a depression amount of the brake pedal to the mechanical brake from a brake operation device including the brake pedal, the solenoid proportional valve being capable of decreasing the signal pressure, wherein the controller controls the solenoid proportional valve such that a braking force of the mechanical brake when the pressure accumulation condition is satisfied is less than the braking force of the mechanical brake when the pressure accumulation condition is not satisfied.

9. The hydraulic system of a construction machine according to claim 6, further comprising a solenoid proportional valve provided on a signal pressure line that leads a signal pressure corresponding to a depression amount of the brake pedal to the mechanical brake from a brake operation device including the brake pedal, the solenoid proportional valve being capable of decreasing the signal pressure, wherein the controller controls the solenoid proportional valve such that a braking force of the mechanical brake when the pressure accumulation condition is satisfied is less than the braking force of the mechanical brake when the pressure accumulation condition is not satisfied.

\* \* \* \* \*